United States Patent [19]

McMurtrey

[11] Patent Number: 4,601,483
[45] Date of Patent: * Jul. 22, 1986

[54] SINGLE BOLT WELDED STEM ASSEMBLY

[76] Inventor: David K. McMurtrey, 540 S. Algonquin Dr., Maysville, Ky. 41056

[*] Notice: The portion of the term of this patent subsequent to Feb. 26, 2002 has been disclaimed.

[21] Appl. No.: 640,955

[22] Filed: Aug. 15, 1984

Related U.S. Application Data

[63] Continuation-in-part of Ser. No. 424,004, Sep. 27, 1982, Pat. No. 4,501,435.

[51] Int. Cl.⁴ .......................................... B62K 21/18
[52] U.S. Cl. ..................................... 280/279; 29/150; 29/526 R; 74/551.1; 403/191
[58] Field of Search .................... 280/279, 280, 276; 74/551.1, 551.2, 551.3, 551.6, 551.7; 403/191, 234, 235, 236; 29/150, 526 R; 72/379

[56] References Cited

U.S. PATENT DOCUMENTS

| D. 31,007 | 6/1899 | Metz | D12/118 |
|---|---|---|---|
| D. 120,650 | 5/1940 | Pawsat | D12/118 |
| D. 146,119 | 12/1946 | Pawsat | D12/118 |
| D. 204,182 | 3/1966 | Pawsat | D12/118 |
| D. 205,823 | 9/1966 | Pawsat | D12/118 |
| 500,941 | 7/1893 | Perkins | 403/190 |
| 689,217 | 12/1901 | Palmer | 74/551.2 |
| 1,215,763 | 2/1917 | Beatty | 403/181 |
| 1,398,447 | 11/1921 | Smith | 74/551.2 |
| 1,791,985 | 2/1931 | VanValkenburg | 228/144 |
| 1,932,251 | 10/1933 | Nauts | 280/270 |
| 2,274,747 | 3/1942 | Schwinn | 74/551.2 |
| 2,366,061 | 12/1944 | Schwinn | 74/551.3 |
| 2,414,275 | 1/1947 | Schwinn | 74/551.4 |
| 2,487,661 | 11/1949 | McCauley | 74/551.6 |
| 2,505,648 | 4/1950 | Pawsat | 403/301 |
| 3,310,325 | 3/1967 | McCauley | 403/377 |
| 3,361,455 | 1/1968 | Hussey | 403/191 |
| 3,385,615 | 5/1968 | Hussey | 403/235 |
| 3,605,248 | 9/1971 | Yoshikawa | 228/173.6 |
| 3,722,930 | 3/1973 | Humlong | 74/551.6 |
| 3,941,011 | 3/1976 | Kirk | 74/551.2 X |
| 4,322,087 | 3/1982 | Addicks | 280/279 |
| 4,337,962 | 7/1982 | Allen et al. | 280/279 |
| 4,501,435 | 2/1985 | McMurtrey | 403/191 X |

FOREIGN PATENT DOCUMENTS

| 2717316 | 10/1978 | Fed. Rep. of Germany . |
| 0568501 | 12/1923 | France . |
| 982353 | 6/1951 | France | 74/551.2 |
| 0331445 | 7/1930 | United Kingdom . |

OTHER PUBLICATIONS

Catalogue excerpt—Wald Manufacturing Co., Nikko, pp. 130–138.

Primary Examiner—John J. Love
Assistant Examiner—Charles R. Watts
Attorney, Agent, or Firm—Wood, Herron & Evans

[57] ABSTRACT

A single bolt, welded bicycle stem assembly for securing the handlebars to the front fork of a bicycle frame. The stem assembly includes a tubular barrel formed with a top end and side wall, and a sheet metal head section. The head section is formed with a cup-shaped top portion and a bottom portion which are bent in a U-shape so that the top portion overlies the bottom portion to form an annular sleeve therebetween adapted to receive and clamp the bicycle handlebars. The bottom portion is formed with spaced, parallel side sections having outwardly extending edges. The head section is adapted to engage the tubular barrel so that its top portion overlies the top end of the barrel and the outwardly extending edges of the bottom portion abut the side wall of the barrel. The head section is connected to a tubular barrel by vertical welds between the outwardly extending edges of the spaced side sections of the bottom portion of the head section and the side wall of the barrel.

7 Claims, 3 Drawing Figures

SINGLE BOLT WELDED STEM ASSEMBLY

RELATED APPLICATIONS

This application is a continuation-in-part of my co-pending application entitled "Welded Stem Assembly," Serial No. 424,004, filed Sept. 27, 1982, now U.S. Pat. No. 4,501,435.

BACKGROUND OF THE INVENTION

This invention relates generally to bicycle stem assemblies, and, more particularly, to a welded, single bolt stem assembly for connecting the handlebars to the front fork of a bicycle frame.

There are a variety of stem assemblies for securing the handlebars of a bicycle to the front fork of a bicycle frame. In bicycles intended for easy use primarily over smooth surfaces such as sidewalks or roadways, single bolt stem assemblies may be used. These single bolt stems are characterized by a single bolt being used to both clamp the handlebar to the stem and to clamp the stem to the fork of a bicycle frame. Single bolt stem assemblies generally include a tubular barrel adapted to mount to the front fork of the bicycle frame and a handlebar clamping head which is connected to the barrel. The handlebar clamping head of known single bolt stems is formed with a top portion, a bottom portion, and a connection portion which is bent into a U-shaped configuration adapted to receive and clamp the handlebars.

In order to mount the handlebar clamping head of prior art single bolt stem assemblies to the tubular barrel, a relatively large bore was characteristically formed in the bottom portion of the head. The top end of the tubular barrel was extended through the bore in the bottom portion of the head and the upper portion of the head extended over the top end of the barrel. In some prior art designs, the handlebar clamping head was welded to the barrel by a circular weld extending around the barrel and interconnecting the bottom portion of the head with the barrel, such as shown in German Pat. No. 2,717,316. In other prior art designs, the bottom portion of the handlebar clamping head seated on a shoulder formed on the barrel, such as shown in French Patent No. 568,501. In either design, a mounting bolt was inserted through a bore formed in the upper portion of the head, through the barrel, and into threaded engagement with a wedge nut adapted to secure the barrel to the front fork of a bicycle frame. The bolt functioned both to urge the upper portion of the head toward the lower portion, thereby clamping the handlebar in the U-shaped intermediate portion of the head, and to pull the wedge nut upwardly relative to the barrel and thereby clamp the stem to the fork of a bicycle frame.

Prior art single bolt stem assemblies are advantageously used in bicycles which are relatively inexpensive or in bicycles which are exclusively intended for roadways or other smooth surfaces. Single bolt stem assemblies are inexpensive to manufacture compared to multiple bolt stem assemblies, because they are made of less material and are simpler to fabricate. However, a significant problem associated with both of the single bolt designs described above is that in order to form the bore in the bottom portion of the head so that it can be placed over the barrel for mounting the head to the barrel, a substantial amount of metal must be removed to form the bore. It has been found that failures often occur in the bottom portion of the head in the area of the bore due to cracking of the relatively thin sections of metal adjacent the bore when the clamping head is tightened about the handlebars and/or when weight is applied to the handlebars during use of the bicycle.

SUMMARY OF THE INVENTION

It is an objective of this invention to provide a single bolt stem assembly which includes a tubular barrel and a handlebar clamping head secured to the tubular barrel in such a fashion that the bottom portion of the head resists failure when the bicycle handlebars are clamped within the handlebar clamping head and when the bicycle is in use.

The stem assembly for securing the handlebars of a bicycle to the front fork of the bicycle frame which accomplishes this objective comprises a tubular barrel, and a sheet metal head which is welded to the tubular barrel. The head section includes top and bottom portions interconnected by a U-shaped intermediate portion. The configuration is such that the top portion overlies the bottom portion and the intermediate portion forms an annular sleeve therebetween for receiving and clamping the bicycle handlebars. The bottom portion is formed with spaced, parallel side sections each having an outwardly extending edge. The head is adapted to engage the tubular barrel so that its top portion overlies and is spaced from the top end of the barrel and the outer edge of each side section abuts the side wall of the barrel along an axis parallel to the longitudinal axis of the barrel. The head and tubular barrel are connected by vertical welds between the outer edges of the bottom side sections and the side wall of the barrel.

The top portion of the head is preferably formed in a cup shape having an annular lip and an inner surface which overlies and is spaced above the top end of the barrel when the head is welded into place on the tubular barrel. The lower end of the tubular barrel is chamfered to receive a wedge nut, which is adapted to secure the stem to the front fork of the bicycle frame. A bolt is inserted through a bore formed in the cup shaped top portion of the head, through the tubular barrel, and then into threaded engagement with the wedge nut. The bolt is tightened within the wedge nut to urge the top portion of the head toward the bottom portion so as to securely clamp a bicycle handlebar in the annular sleeve formed therebetween.

A method of manufacturing the single bolt, welded stem assembly according to this invention comprises the steps of forming a tubular barrel, forming a sheet of metal into a planar head profile having a top and bottom portion at opposite ends and an intermediate portion therebetween with the bottom portion having laterally extending side sections formed with outwardly extending edges, forming the top portion in a cup shape, bending the intermediate portion so that the top portion overlies the bottom portion forming an annular sleeve therebetween to receive and clamp the bicycle handlebars, bending the side sections of the bottom portion parallel to one another, positioning the head relative to the tubular barrel so that the cup-shaped top portion overlies the top end of the barrel and the outer edges of the side sections of the bottom portion abut the side wall of the barrel and then welding each of the outer edges of the side sections to the side wall of the barrel to secure the head to the barrel.

The construction of the single bolt, welded stem assembly of this invention provides a stronger connection between the head and barrel than known single bolt stem assemblies. Instead of forming a large bore in the bottom portion of the head for insertion over the barrel to secure the head thereto as in prior art designs, the head of this invention is provided with a bottom portion having spaced side sections whose edges abut the side wall of the barrel and extend parallel to its longitudinal axis. The edges of the side sections of the head are connected by vertical welds to the side wall of the barrel.

In addition, the method of forming the stem assembly herein employs relatively inexpensive progressive dies in forming both the head and tubular barrel. This is in contrast to some types of single bolt stem assemblies which are made by more expensive operations such as by machine forging.

DESCRIPTION OF THE DRAWINGS

The structure operation and advantages of this invention will become further apparent upon consideration of the following description taken in conjunction with the accompanying drawings wherein.

DETAILED DESCRIPTION OF THE INVENTION

Figure 1:
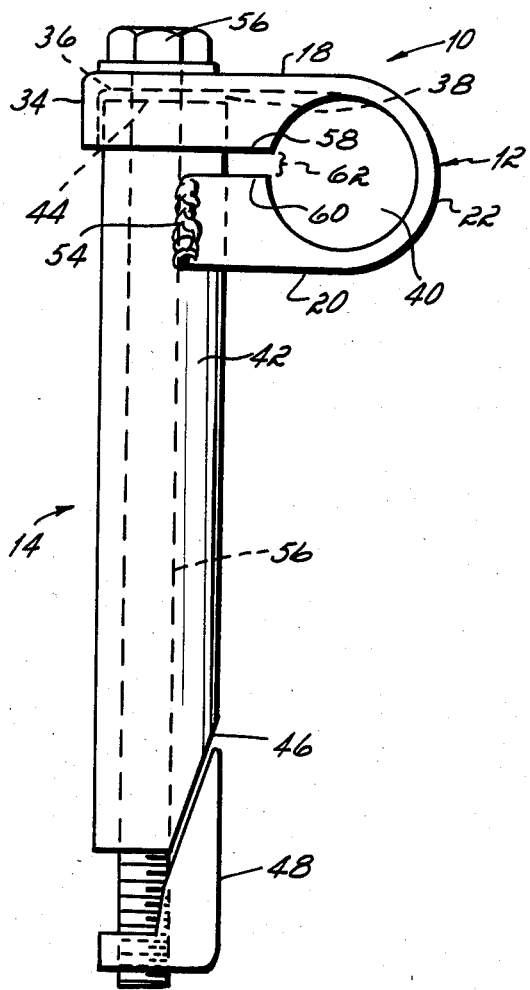
FIG. 1 is an assembled view of the welded stem assembly of this invention.

Referring now to the drawings, the stem assembly 10 of this invention includes a head 12 connected to a tubular barrel 14 which is adapted to mount to the front fork of a bicycle frame (not shown). The head 12 and barrel 14 are made in separate operations and then welded together to form the complete stem assembly 10, as described below.

Figure 3:
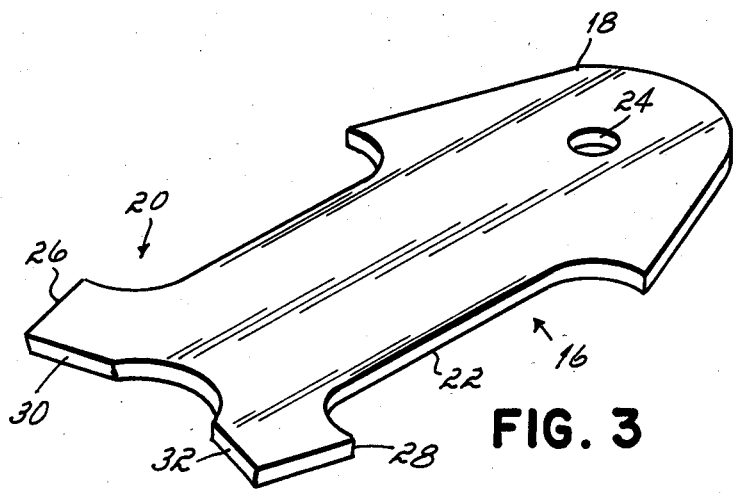
FIG. 3 is a perspective view of the sheet metal blank from which the completed sheet metal head section shown in FIGS. 1 and 2 is formed.

Preferably, the head 12 is formed in a multiple-stage profiling and forming progressive die from a blank 16 of sheet metal stock as partially schematically indicated in the Figures. The sheet metal blank 16 is profiled from flat metal stock to form the configuration shown in FIG. 3. The blank 16 includes a curved top portion 18 at one end, a bottom portion 20 at the opposite end and, an intermediate portion 22 therebetween. A bore 24 is formed in the center of top portion 18. A pair of side sections 26, 28 extend laterally outwardly from the bottom portion 20 and are formed with side edges 30, 32, respectively.

Figure 2:
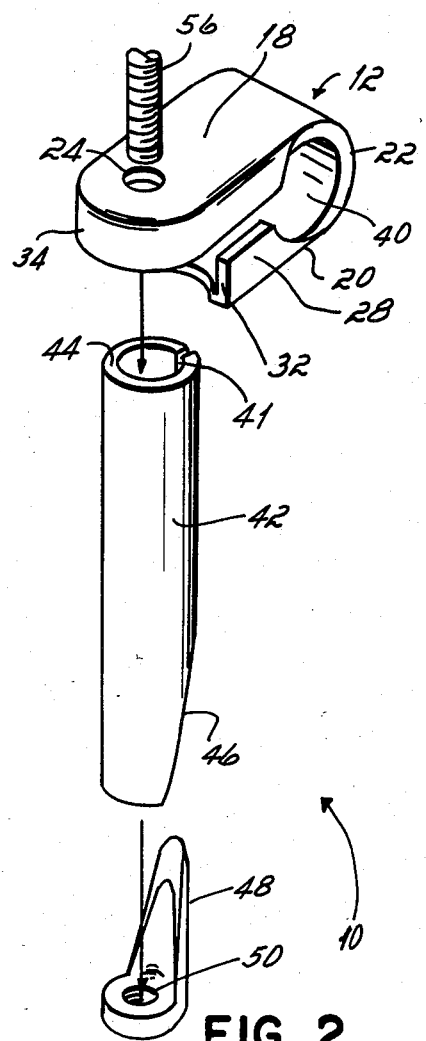
FIG. 2 is an exploded perspective view of the welded stem assembly shown FIG. 1.

The completed head 12 shown in FIGS. 1 and 2 is formed in a multiple-stage die operation. The outer edge of top portion 18 is bent at a right angle to the remaining part of top portion 18 forming a cup-shaped section having an outer, annular lip 34 perpendicular to an inner surface 36. The intermediate portion 22 is bent in a U-shape so that the top and bottom portions 18, 20 are generally parallel to one another with the top portion 18 overlying the bottom portion 20 and forming a space 62 therebetween. The U-shaped bend in the intermediate portion 22 forms an annular sleeve 40 between top and bottom portions 18, 20 which is adapted to receive the handlebars of a bicycle (not shown).

In one embodiment of this invention, the barrel 14 is made from a flat section of metal stock formed by a progressive die into tube shape. This forming operation is disclosed in detail in my copending application Ser. No. 424,004 entitled, "Welded Stem Assembly" and is not repeated in detail herein. Generally, such forming operation involves progressively bending a flat piece of metal stock so that its sides curve in a cylinder or tube shape and its edges close together to form a seam 41 in the side wall 42 of barrel 14. Alternatively, barrel 14 may be formed from a continuous section of tubing cut to the appropriate length. In either manner of forming the tube shaped barrel 14, the barrel 14 includes a longitudinal axis, a planar top end 44, a chamfered bottom end 46 and a side wall 42. The chamfered bottom end 46 is adapted to engage a wedge nut 48 having a central bore 50 with internal threads. The wedge nut 48 is adapted to secure the stem to the front fork of a bicycle frame (not shown).

The completed stem assembly 10 is formed by connecting the head 12 to the tubular barrel 14. This is accomplished by first placing the head 12 into engagement with the barrel 14 such that the top portion 18 of head 12 overlies the top end 44 of barrel 14 with its central bore 24 aligning with barrel 14, and the side edges 30, 32 of side sections 26, 28 abutting the side wall 42 of barrel 14. The head 12 is positioned relative to the barrel 14 so that the inner surface 36 of the top portion 18 is disposed above and spaced from the top end 44 of barrel 14 a space or distance 38. The parallel, spaced side edges 30, 32 of side sections 26, 28 formed in bottom portion 20 are then connected to the side wall 42 of barrel 14 by separate vertical welds 54. The spaced edges 30, 32 of side sections 26, 28 are substantially parallel to the longitudinal axis of barrel 14 so that upon application of the vertical welds 54, a strong dependable welded connection is established between the head section 12 and barrel 14. If the barrel 14 is formed with a seam 41, the head section 12 is preferably positioned relative to the barrel 14 so that the side sections 26, 28 formed in bottom portion 20 abut the barrel side wall 42 on opposite sides of the seam 41.

To secure the bicycle handlebars within the annular sleeve 40 of head 12, a bolt 56 is inserted through the bore 24 in top portion 18, through the tubular barrel 14 and then into threaded engagement with the wedge nut 48. When not tightened, the annular sleeve 40 easily receives the bicycle handlebars to facilitate assembly. To then secure the handlebars in place within the sleeve 40, the bolt 56 is threaded into wedge nut 48 and tightened so as to wedge the nut 48 into tight engagement with a bore (not shown) of a bicycle frame fork and then urge the top portion 18 of the head 16 toward the bottom portion 20, and thereby clamp the handlebars within sleeve 40. Preferably, the space 38 between the inner surface 36 of top portion 18 and the top end 44 of barrel 14 is sufficient to permit the desired torque to be applied to bolt 56 for securely tightening the handlebars within sleeve 40, without the top portion of the head 12 contacting the barrel 14. In addition, the bottom edge 58 of the top portion 18 is spaced from the top edge 60 of bottom portion 20 a distance 62 which is greater than the space 38 between the bottom surface 36 of the top portion 18 and the top end 44 of barrel 14 to prevent contact between the top and bottom portions 18, 20 of the head 12 as the bolt 56 is tightened. This assures that sufficient clamping force can be applied to the bicycle handlebars to prevent loosening during use.

While this invention has been described with reference to a preferred embodiment, it will be understood by those skilled in the art that various changes may be made and equivalents may be substituted for elements thereof without departing from the scope of the invention. In addition, many modifications could be made to adapt a particular situation or material to the teachings of the invention without departing from the essential scope thereof. Therefore it is intended that the invention not be limited to the particular embodiment disclosed as the best mode contemplated for carrying out this invention, but that the invention will include all embodiments falling within the scope of the appended claims.

I claim:

1. A stem assembly for securing the handlebars of a bicycle to the front fork of the bicycle frame comprising:
   a tubular barrel having a longitudinal axis, a top end, a bottom end, and a side wall;
   a sheet metal head including a top portion and a bottom portion, said bottom portion having spaced, parallel side sections, said head engaging said tubular barrel with said top portion overlying said top end of said tubular barrel and said side sections of said bottom portion abutting said side wall of said tubular barrel, each of said side sections of said bottom portion having a longitudinal edge extending generally parallel to said longitudinal axis of said tubular barrel, said head and tubular barrel being connected by weld means between each of said longitudinal edges of said side section of said bottom portion of said head and said side wall of said tubular barrel.

2. A stem assembly as in claim 1 in which said top portion of said head overlies and is spaced from said bottom portion, an annular sleeve portion of said head extending between said top and bottom portions of said head, said annular sleeve portion of said head being adapted to receive bicycle handlebars, a wedge nut having a threaded section located beneath said bottom end of said tubular barrel, said wedge nut being adapted to secure said tubular barrel to the front fork of a bicycle frame, said top portion of said head being formed with a bore, a bolt extending through said bore in said top portion of said head, through said tubular barrel, and into threaded engagement with said threaded sections of said wedge nut, said bolt being adapted to be tightened within said nut to urge said top portion of said head toward said bottom portion thereof for tightening said annular sleeve about bicycle handlebars.

3. A stem assembly as in claim 2 in which said top portion of said head is spaced from said top end of said barrel, said space between said top and bottom portions of said head being greater than said space between said top portion of said head and said top end of said tubular barrel.

4. A stem assembly as in claim 1 in which said top portion of said head is formed in a cup-shape having an outer, annular lip extending generally perpendicularly to an inner surface, said inner surface extending over said top end of said tubular barrel and being spaced from said top end of said barrel.

5. A stem assembly as in claim 1 in which said side wall of said tubular barrel is formed with a seam, said head being adapted to engage said tubular barrel such that said side sections of said bottom portion abut said side wall of said tubular barrel on either side of said seam of said tubular barrel, said longitudinal edge of each of said side sections being welded to said side wall of said tubular barrel on either side of said seam.

6. A stem assembly for securing the handlebars of a bicycle to the frame comprising:
   a tubular barrel having a longitudinal axis, a top end, a bottom end and a side wall;
   a sheet metal head having a top portion, a bottom portion, and a handlebar clamping portion interconnecting said top and bottom portions, said bottom portion being formed with spaced, parallel side sections, said head engaging said tubular barrel with said top portion overlying said top end of said tubular barrel and said side sections of said bottom portion abutting said side wall of said tubular barrel, each of said side sections of said bottom portion having a longitudinal edge extending generally parallel to said longitudinal axis of said tubular barrel, said head and tubular barrel being connected by weld means between each of said longitudinal edges of said side sections of said bottom portion of said head and said side wall of said tubular barrel.

7. A method of manufacturing a bicycle stem comprising the steps of;
   forming a tubular barrel having a longitudinal axis, a top end, a bottom end and a side wall;
   forming a sheet of metal into a planar head profile having a top portion at one end, a bottom portion at the other end, and an intermediate portion between said top and bottom portions;
   said bottom portion having a pair of side sections extending laterally from said bottom portion, each of said side sections having an edge;
   forming said top portion of said planar head profile into a generally cup-shape;
   bending said intermediate portion of said planar head profile into an annular sleeve configuration so that said top and bottom portions of said head profile are substantially parallel and spaced from one another;
   bending said pair of side sections of said bottom portion so that said side sections extend generally parallel to one another;
   positioning said head relative to said tubular barrel such that said cup-shaped top portion overlies said top end of said tubular barrel and said edges of said side sections of said bottom portion abut said side wall of said tubular barrel, said side edges of said side sections being spaced from one another and extending parallel to said longitudinal axis of said tubular barrel; and
   welding each of said side edges of said side sections to said side wall of said barrel to fix said head to said barrel.

* * * * *